US008661336B2

(12) United States Patent
Hackmann et al.

(10) Patent No.: US 8,661,336 B2
(45) Date of Patent: Feb. 25, 2014

(54) MAPPING AN OBJECT TYPE TO A DOCUMENT TYPE

(75) Inventors: Herbert Hackmann, Wiesloch (DE); Kai Dehmann, Rauenberg (DE)

(73) Assignee: SAP AG, Walldorf (DE)

( * ) Notice: Subject to any disclaimer, the term of this patent is extended or adjusted under 35 U.S.C. 154(b) by 70 days.

(21) Appl. No.: 13/075,418

(22) Filed: Mar. 30, 2011

(65) Prior Publication Data
US 2012/0254719 A1    Oct. 4, 2012

(51) Int. Cl.
*G06F 17/00*    (2006.01)

(52) U.S. Cl.
USPC ............ 715/234; 715/255; 715/243; 715/212

(58) Field of Classification Search
USPC .................................................. 715/234, 255
See application file for complete search history.

(56) References Cited

U.S. PATENT DOCUMENTS

| 6,421,656 | B1 * | 7/2002 | Cheng et al. ........................ 1/1 |
| 6,502,112 | B1 | 12/2002 | Baisley |
| 6,584,459 | B1 | 6/2003 | Chang et al. |
| 6,591,272 | B1 * | 7/2003 | Williams ............................. 1/1 |
| 6,785,673 | B1 * | 8/2004 | Fernandez et al. .................... 1/1 |
| 6,810,429 | B1 * | 10/2004 | Walsh et al. .................. 709/246 |
| 6,925,470 | B1 * | 8/2005 | Sangudi et al. ....................... 1/1 |
| 7,031,956 | B1 * | 4/2006 | Lee et al. ............................. 1/1 |
| 7,092,967 | B1 | 8/2006 | Pannala et al. |
| 7,178,102 | B1 * | 2/2007 | Jones et al. .................... 715/235 |
| 7,461,074 | B2 * | 12/2008 | Murthy et al. ....................... 1/1 |
| 7,818,662 | B2 * | 10/2010 | Nene et al. .................... 715/224 |
| 7,853,553 | B2 * | 12/2010 | Lankinen et al. ............. 707/602 |
| 7,921,359 | B2 * | 4/2011 | Friebel et al. ................. 715/249 |
| 8,095,561 | B2 * | 1/2012 | Lu et al. ........................ 707/792 |
| 8,290,916 | B2 * | 10/2012 | Vu et al. ........................ 707/694 |
| 2002/0116416 | A1 * | 8/2002 | Tesch et al. ................... 707/516 |
| 2004/0044793 | A1 | 3/2004 | Pauly et al. |
| 2004/0163041 | A1 * | 8/2004 | Engel ............................ 715/509 |
| 2004/0181543 | A1 * | 9/2004 | Wu et al. ....................... 707/102 |
| 2005/0125720 | A1 * | 6/2005 | Little et al. .................... 715/513 |
| 2005/0216501 | A1 * | 9/2005 | Cengiz et al. ............. 707/103 R |
| 2005/0273703 | A1 * | 12/2005 | Doughan ...................... 715/513 |

(Continued)

OTHER PUBLICATIONS

'XML Schema Mapping' [online] Stylus Studio, 2005-2011, [retrieved on Mar. 28, 2011]. Retrieved from the Internet: <URL: http://www.stylusstudio.com/xsd_to_xsd.html>, 2 pages.

(Continued)

*Primary Examiner* — Cesar Paula
*Assistant Examiner* — Mohammed-Ibrahim Zuberi
(74) *Attorney, Agent, or Firm* — Fish & Richardson P.C.

(57) ABSTRACT

In general, the subject matter described in this specification can be embodied in methods, systems, and program products for mapping an object type to a document type. A computer system stores configuration templates that each identify a mapping of an object type to a markup language document type. The computer system displays a graphical user interface that permits a user of the computing system to select a configuration template. The computer system displays a list of the at least some attributes and, for each of the attributes, the associated markup language attribute or element that is identified by the selected configuration template. The computer system receives second user input that changes an association of one of the attributes so that the attribute is instead associated with a different markup language attribute or element. The computer system stores an updated mapping of the object type to the markup language document type.

20 Claims, 10 Drawing Sheets

(56) References Cited

U.S. PATENT DOCUMENTS

| | | | |
|---|---|---|---|
| 2006/0173865 A1* | 8/2006 | Fong | 707/100 |
| 2006/0190814 A1* | 8/2006 | Collie et al. | 715/513 |
| 2006/0195781 A1* | 8/2006 | Jatavallabha et al. | 715/506 |
| 2007/0016851 A1* | 1/2007 | Fan et al. | 715/513 |
| 2007/0192351 A1* | 8/2007 | Liu et al. | 707/102 |
| 2007/0271394 A1 | 11/2007 | Pauly et al. | |
| 2008/0046501 A1 | 2/2008 | Pauly et al. | |
| 2008/0065654 A1* | 3/2008 | Agrawal et al. | 707/100 |
| 2008/0320023 A1* | 12/2008 | Fong | 707/101 |
| 2009/0112916 A1 | 4/2009 | Stuhec | |
| 2009/0327321 A1* | 12/2009 | McCormack et al. | 707/101 |
| 2010/0057760 A1* | 3/2010 | Demant et al. | 707/101 |
| 2010/0058169 A1* | 3/2010 | Demant et al. | 715/234 |
| 2010/0058170 A1* | 3/2010 | Demant et al. | 715/234 |
| 2012/0102024 A1* | 4/2012 | Campbell et al. | 707/722 |
| 2012/0102095 A1* | 4/2012 | Campbell et al. | 709/203 |
| 2012/0102386 A1* | 4/2012 | Campbell et al. | 715/229 |

OTHER PUBLICATIONS

'XML Schema Patterns for Common Data Structures' [online] W3C, 2005, [retrieved on Mar. 28, 2011]. Retrieved from the Internet: <URL: http://www.w3.org/2005/07/xml-schema-patterns.html >, 10 pages.

* cited by examiner

MAPPING AN OBJECT TYPE TO A DOCUMENT TYPE

TECHNICAL FIELD

This document relates to a computer process to map data.

BACKGROUND

Computer systems can store information as objects. Multiple ones of the objects may be of a same type. As such, these objects may have been generated based on a schema that identifies constraints on the structure and content of the objects. For example, the schema can identify the attributes that may be included in objects that are generated in accordance with the schema, and can further identify attributes that are required in the objects. The attributes can identify semantics of corresponding data values, although the schema may not include data values. Objects that are created in accordance with the schema, however, include at least some of the attributes from the schema and include corresponding data values. In some examples, a data value is enclosed within an opening tag and a closing tag of its corresponding attribute.

As an illustration, a computer system can store multiple objects that are each of a "purchase order" object type. A first of the objects can identify a purchase order from a first customer and a second of the objects can identify a purchase order from a second customer. Each of the purchase order objects may include a "Customer" attribute that was specified as required by a purchase order schema. The "Customer" data values may be different in each of the objects. For instance, the data value for the customer attribute in the first object may be "Customer B" while the data value for the customer attribute in the second object may be "Customer E."

Data may be stored in markup language documents (e.g., XML (Extensible Markup Language) documents). Similar to the above-described objects, the XML documents may be generated based on a schema, and may include data elements that identify semantics of data values. The XML documents may be structured according to an XML schema (e.g., an XSD ("XML Schema Definition") or a DTD ("Document Type Definition")). An XML schema and a schema for an object type, however, may not be the same. For example, the attributes of the object schema may not be named the same as XML elements or attributes of an XML schema. As such, a system that is configured to interpret XML documents that were generated based on a particular XML schema may not be able to interpret the objects that include similar information but that were generated based on a non-XML object schema.

SUMMARY

This document describes techniques, methods, systems, and other mechanisms for mapping data. In general, one aspect of the subject matter described in this specification can be embodied in a computer-implemented method for mapping an object type to a document type. The method includes storing, by a computing system, configuration templates that each identify a mapping of an object type to a markup language document type, each of the configuration templates including a database table that identifies, for each of at least some attributes of the object type, an associated markup language attribute or element of the markup language document type. The method includes displaying, by the computing system, a graphical user interface that permits a user of the computing system to select a first configuration template from a displayed set of the configuration templates. The method includes receiving, by the computing system, first user input that selects the first configuration template. The method includes displaying, by the computing system and in the graphical user interface, a list of the at least some attributes and, for each of the at least some attributes, the associated markup language attribute or element that is identified by the first configuration template. The method includes receiving, by the computing system, second user input that changes an association of one of the attributes in the list so that the one attribute in the list is instead associated with a different markup language attribute or element than the markup language attribute or element that is identified by the first configuration template for the one attribute. The method includes storing, by the computing system and in response to receiving the second user input, an updated mapping of the object type to the markup language document type, the updated mapping including the association between the one attribute and the different markup language attribute or element. The method includes receiving, by the computing system, third user input that requests generation of a first markup language document representation of a first object that is of the object type, wherein the first object is one of multiple objects that are of the object type. The method includes generating, by the computing system and using the updated mapping in response to receiving the third user input, the first markup language document.

Additional aspects can optionally include one or more of the following features. The method can include receiving, by the computing system, fourth user input that requests creation of a second object that is of the object type from a second markup language document that is of the markup language document type. The method can include generating, by the computing system and using the updated mapping, the second object for storage by the computing system, the second object representing content of the markup language document. The updated mapping may include a database table that identifies associations between attributes of the object type and markup language attributes or elements of the markup language document type. The updated mapping may not include a markup language schema, a markup language document, or an XSLT document.

The method may include receiving, by the computing system, fourth user input that requests an addition of a new attribute to the list, the new attribute being an attribute of the object type but not being one of the at least some attributes initially displayed in the list. The method may include displaying, by the computing system, the new attribute in the list. The method may include receiving, by the computing system, fifth user input that specifies a name for a new markup language attribute or element that is to be associated with the new attribute. The updated mapping may include an association between the new attribute and the new markup language attribute or element.

The graphical user interface may permit the user to specify, for an association between a particular attribute of the object type and an associated particular markup language attribute or element, a value mapping of a first data value for the particular attribute to a second data value for the particular markup language attribute or element, the first data value and the second value being different, the particular attribute specifying semantics of the first value and the particular markup language attribute or element specifying semantics of the second data value. The graphical user interface may permit the user to change, for an association between a particular attribute of the object type and an associated particular markup language attribute or element, a value of a "MaxOccurs" property of the particular markup language attribute or element from "0" to "*", without the user providing user input that specifies "*".

The graphical user interface may further permit the user to alternatively generate a mapping between the object type and a second type of markup language document by: (i) the computing system receiving fourth user input that selects a markup language schema that identifies a structure and content of the second type of markup language document from a list of multiple markup language schemas for identifying structure and content of multiple respective types of markup language documents; (ii) the computing system comparing names of attributes of the object type to names of markup language attributes and elements of the markup language schema in order for the computing system to propose a mapping of the attributes of the object type to the markup language attributes and elements of the markup language schema; and (iii) the computing system displaying the proposed mapping to the user to enable the user to modify the proposed mapping.

Other embodiments of the described aspects include corresponding computer-readable storage devices storing instructions that, when executed by one or more processing devices, perform operations according to the above-described methods. Other embodiments may include systems and apparatus that include the described computer-readable storage devices and that are configured to execute the operations using one or more processing devices.

Particular embodiments can be implemented, in certain instances, to realize one or more of the following advantages. A user that is not familiar with schema mapping may map an object schema to an XML schema. The user interface that is displayed to the user may provide multiple different formats for mapping the object schema to the XML schema. Thus, the user may select a mapping format that is appropriate based on the user's experience and based on the constraints of the mapping.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
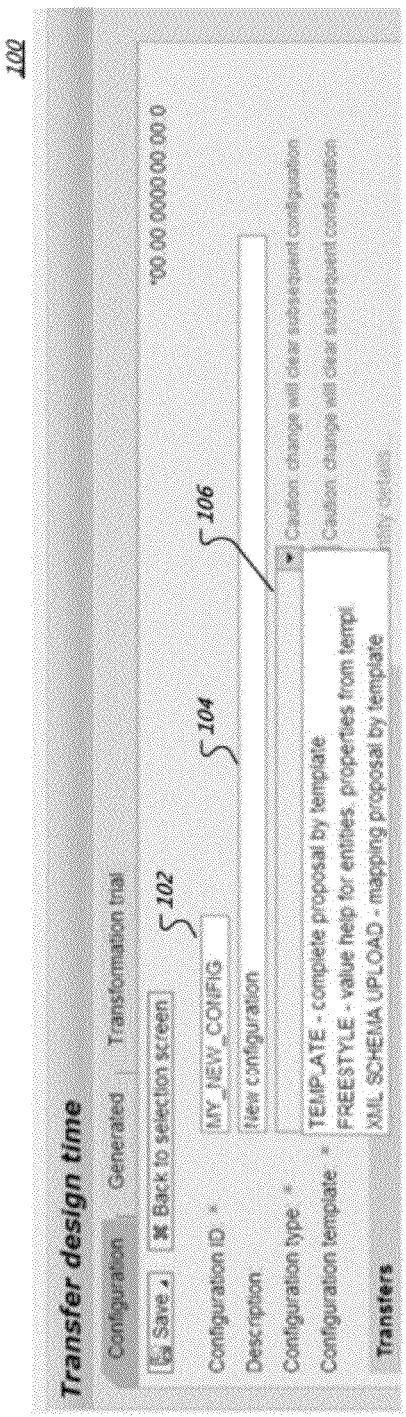
FIG. 1 shows a user interface for mapping a type of object to a type of XML document.

This document generally describes a computer process to map data. In general, a computer system may display a graphical user interface that allows a user to map objects that are stored by the computer system into an external format. The objects themselves may not store data according to the external format. Thus, in order for systems that recognize data in the external format to interpret the data, the content of the object may be transformed into the external format.

The user interface may allow the user to select one of many configuration templates to use in configuring a mapping between an object type and an XML document type. Each configuration template may include a suggested mapping of object attributes, for an object of a particular object type, to XML attributes and elements of an XML document of a particular XML document type. Upon selecting one of the configurations templates, the graphical interface may show the user the suggested mapping of object attributes to XML attributes for the selected configuration template.

The display of the suggested mapping includes, for each display of an object attribute, a display of an associated XML attribute or element. The combination of an object attribute and its associated XML attribute or element is referred to herein as an association. The user interface may display multiple associations. The user interface display of each association may include a display of other characteristics of the association. The user interface may enable the user to modify the characteristics for each association.

The user interface may enable a user to add an association to the mapping or remove an association from the mapping. Further, the user may change a mapping, for example, by changing the name of an association's object attribute or by changing a name of the association's XML attribute or element. The user may change the name of an object attribute by selecting a new object attribute name from a displayed set of object attribute names, or by typing a new object attribute name in a field that displays the name of the object attribute.

As such, the user may modify the mapping that is suggested by the selected configuration template. The user may save the modified mapping as a customer defined configuration template. The computer system may store the customer defined configuration template in a table of a database, for example, where each row of the table includes details of an association. In some examples, the customer defined configuration template may not be stored as an XML file or as an XSLT (Extensible Stylesheet Language Transformations) document.

The user may generate a transformation template from the user modified mapping. The transformation template identifies a mapping between an object and an XML document and can be used by a runtime system that converts objects to XML documents and vice versa. More specifically, the user may use the transformation template to export the content of objects of the particular object type to XML documents of the particular XML type. The user may also use the transformation template to import the content of XML documents of the particular XML type to objects of the particular object type.

In general, a computer system may store internal "information objects" in a format that is recognized by an application program of the computer system, but that is not recognized by at least some other application programs. In order for the other application programs to use the information from the internal objects, the information may need to be transferred to a file that is of a different data format. For example, the content of internal objects may be used to generate XML documents that are structured according to a particular XML schema. The other application programs may be able to use the information that is in the XML documents. The internal objects may be stored in a database while the XML documents may not be stored in a database.

Internal object attributes may be named differently than their associated XML attributes and elements. For example, a schema for an internal object type of "person" may include attributes that identify the different types of information that can be stored in association with an individual (e.g., the person's "name" and "address"). Five instances of the "person" schema may contain information on five different people, and thus five different "names" and "address(es)."

An XML schema may also include XML attributes and elements that identify information that can be stored in association an individual (e.g., the person's "fullname" and "homeaddress"). As noted in this illustration, the XML attributes and elements may identify the same type of information as the objects but with different names. For example, the data elements "name" and "fullname" may refer to the same information. As such, a system may access a mapping in order to associate an object attribute with an XML attribute or element (e.g., so that the data value that is stored under "name" in an object is stored under "fullname" in an XML file).

Although this document refers to XML schemas, XML document types, XML documents, and XML attributes and elements, the description in this document similarly applies to markup languages of other types (e.g., other markup language schemas, other markup language XML document types, other markup language documents, and other markup language attributes and elements).

FIG. 1 shows a user interface 100 for mapping a type of object to a type of XML document. A user may use the user interface 100 to generate a user-generated configuration that specifies a mapping between at least one object type (e.g., a particular object schema) and at least one XML document type (e.g., a particular XML schema).

In this illustration, a user may specify a name for the user-generated configuration by typing a name into the "Configuration ID" input field 102. For example, the user may move a mouse cursor over the input field 102, may click a mouse button while the cursor is over the input field, and may thereafter type the text "MY_NEW_CONFIG" into the input field 102. The user may also specify a description for the user-generated configuration by typing "New configuration" into the description input field 104.

The configuration user interface 100 permits the user to generate a user-generated configuration using any of three configuration types. For example, the user may use the pull down menu 106 to select one of the "TEMPLATE" configuration type, the "FREESTYLE" configuration type, or the "XML SCHEMA UPLOAD" configuration type. The use of these three configuration types will be discussed hereafter in turn.

Figure 2:
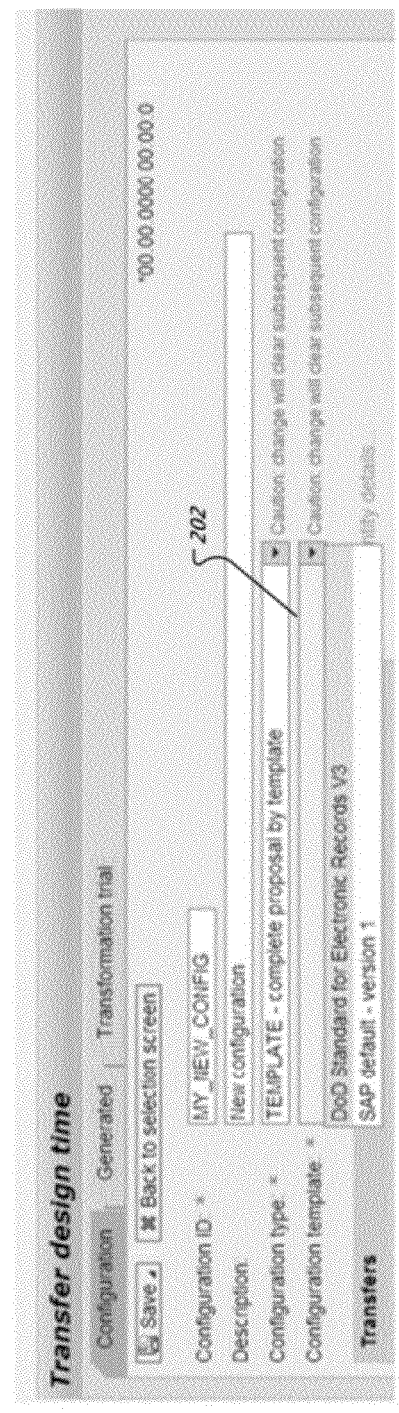
FIG. 2 shows a user interface for mapping an object type to an XML document type using a "template" configuration type.

FIG. 2 shows a user interface 200 for mapping an object type to an XML document type using a "template" configuration type. In this illustration, the user has selected the "TEMPLATE" configuration type from the pull down menu 106 in FIG. 1. In response, the computing system populated the configuration template pull down menu 202 with the "DoD Standard for Electronic Records V3" and "SAP default—version 1" configuration template options.

Figure 3:
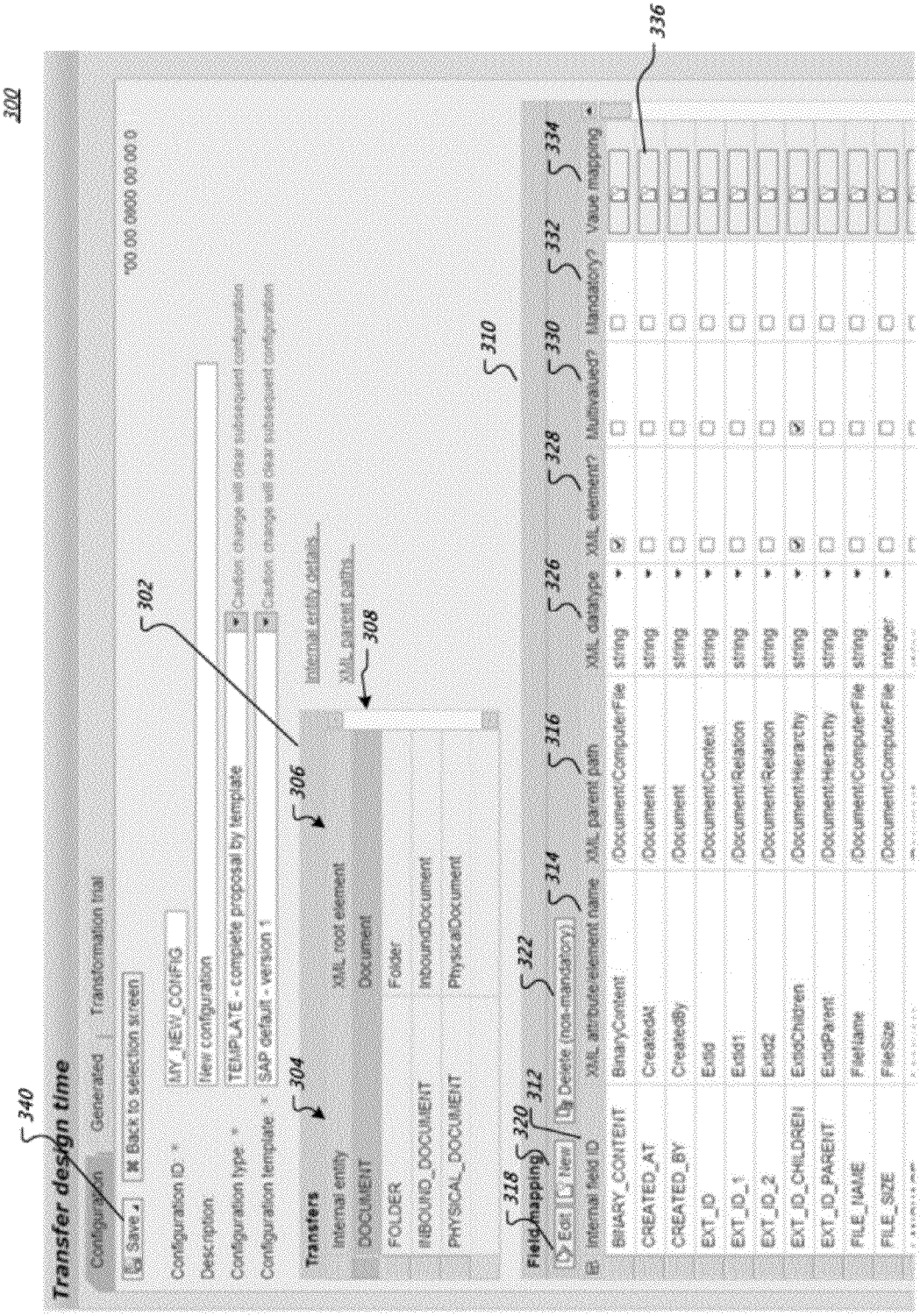
FIG. 3 shows a user interface for modifying mapping associations using a "template" configuration type.

FIG. 3 shows a user interface 300 for modifying mapping associations using a "template" configuration type. In this example, the user has selected the "SAP default—version 1" configuration template option from the pull down menu 202 in FIG. 2. In response, the computer system retrieved information that is associated with the selected configuration template. The configuration template may identify multiple object types and, for each of the multiple object types, associations between attributes of the object type and XML document attributes or elements.

The "Transfers" portion 302 of the graphical user interface 300 displays a list of the internal entities 304 and associated XML root elements 306 that are specified by the selected configuration template. Each internal entity is the name of an object type. Each XML root element is the name of a root element of an XML document type.

A user may view the details of mapping associations between a particular object type and an XML document type by selecting the row that lists the corresponding "Internal entity" and "XML root element." For example, in this illustration the user has selected the "'DOCUMENT' and 'Document'" row 308.

In response to user selection of row 308, the user interface 300 presents associations in the "Field Mapping" portion 310 of the user interface 300. For example, the field mapping portion 310 shows a list of attributes for the presently selected row 308. The attributes that are displayed for the presently selected row 308 may be all the attributes of the selected object type or a subset of the attributes of the selected object type. For example, some of the attributes for the "DOCUMENT" object type may not be shown because the attributes correspond to data that is unnecessary to include in a "Document" XML document.

In this example, the name for each object attribute is displayed under the "Internal Field ID" column 312. The name of the XML attribute or element that is associated with the object attribute is listed under the "XML attribute/element name" column 314. The location at which the XML attribute or object is to be placed within an XML document is identified by the "XML parent path" column 316. For example, XML attributes or elements that have a parent path of "/Document" are attributes or elements that are nested within the root element "Document," and that are not nested within any other elements. XML attributes or elements that have a parent path of "/Document/Context" are nested within the "Context" element, which itself is nested within the "Document" element.

A user may edit the "Internal field ID" 312, the "XML attribute/element name" 314, and the "XML parent path" 316 for any row in the table. For example, the user may select the "Edit" graphical interface element 318, and in response the computing system may permit the user to edit the values for the fields of the table. For example, the user may select the "Created_By" attribute name. In response, the user may either type a different attribute name or may select another attribute name from a displayed set of object attribute names that are of the object type "DOCUMENT." The displayed set of object attribute names may include object attribute names that were not originally displayed in the field mapping portion 310 of the user interface 300.

A user may similarly select to edit the "CreatedBy" XML attribute/element name. In response, the user may type a different XML attribute/element name. Further, the user may select to edit the "XML parent path" 316. In response, the user may type a different parent path or may select a parent path from a displayed set of parent paths that are valid for the XML document type "Document."

A user may add an association between an internal object and an XML attribute or element by selecting the "New" graphical interface element 320. In response, the user may create an association by: (i) selecting an "Internal field ID 312" from a list of object attribute names, (ii) specifying an "XML attribute/element name," and (iii) specifying an "XML parent path" 316. The user may select the "Delete" graphical interface element 322 in order to delete a user-specified association from the table.

The field mapping portion 310 of the user interface 300 may permit the user to modify characteristics of each association. For example, the "XML datatype" column 326 permits the user to identify a type of a data that is stored by the data value that corresponds to the XML attribute or element. For instance, the value "153" may be stored as an integer or as a string, and an XML attribute or element can specify whether the number is an integer or a string.

The "XML element?" column 328 includes a checkbox for each association. The user may select a checkbox to indicate that the association's "XML attribute/element name" is for an XML element and not an XML attribute. The user may leave the checkbox empty to indicate that the association's "XML attribute/element name" is for an XML attribute of an XML element.

The "Multivalued?" column 330 includes a checkbox for each association. The user may select a checkbox to indicate that the association's XML attribute or element should include an indication that the XML attribute or element is multivalued. For example, if the checkbox is selected, the corresponding XML attribute or element may include an indication that "MaxOccurs=*". If the checkbox is not selected, the corresponding XML attribute or element may include an indication that "MaxOccurs=1".

The "Mandatory?" column 332 includes a checkbox for each association. The user may select a checkbox to indicate that the XML element or attribute is mandatory. For example, if the checkbox is selected, a runtime mapping must map a value for the association or the mapping may fail.

The "Value Mapping" column 334 enables a user to specify value mappings for each association. For example, upon selection of graphical interface element 356, the user interface 300 displays a pop-up dialog box. The pop-up box may include multiple sets of input fields for mapping different values. As an illustration, a user may enter the value "MN" into a first input field of a set and "Minnesota" into a second input field of the set. As such, the computing system, when mapping a "CREATED_AT" internal object attribute to a "CreatedAt" XML attribute, would use the value "Minnesota" if the object attribute's value was "MN." If the value for the "CREATED_AT" internal object attribute did not match any of the values that the user specified in the multiple sets of input fields, the value may be copied to the associated XML attribute without any change.

After a user has modified the configurations settings proposed by the "SAP default—version 1" configuration template, the user may save the modified settings as a user-generated configuration by selecting the "Save" interface element 340. In response, the computer system may store, in a database, the associations that are shown for each of the rows in the transfers portion 302 of the screen. For example, the associations for each row in the transfers portion 302 of the screen may be stored in different tables in a database. The data may not be stored as an XSLT document, an XML schema, or an XML document. In some examples, the data may not be stored in a form that can be used by a run-time "object to XML document" mapping system. Storing the data in a database may enable quick retrieval of the information for further configuration. The computer system may not need to parse an XML document to obtain the data from the database.

This document will later discuss use of a user-generated configuration in a run-time mapping of objects to XML documents and vice versa. First, however, this document details the two other mechanisms for creating a user-generated configuration.

Figure 4:
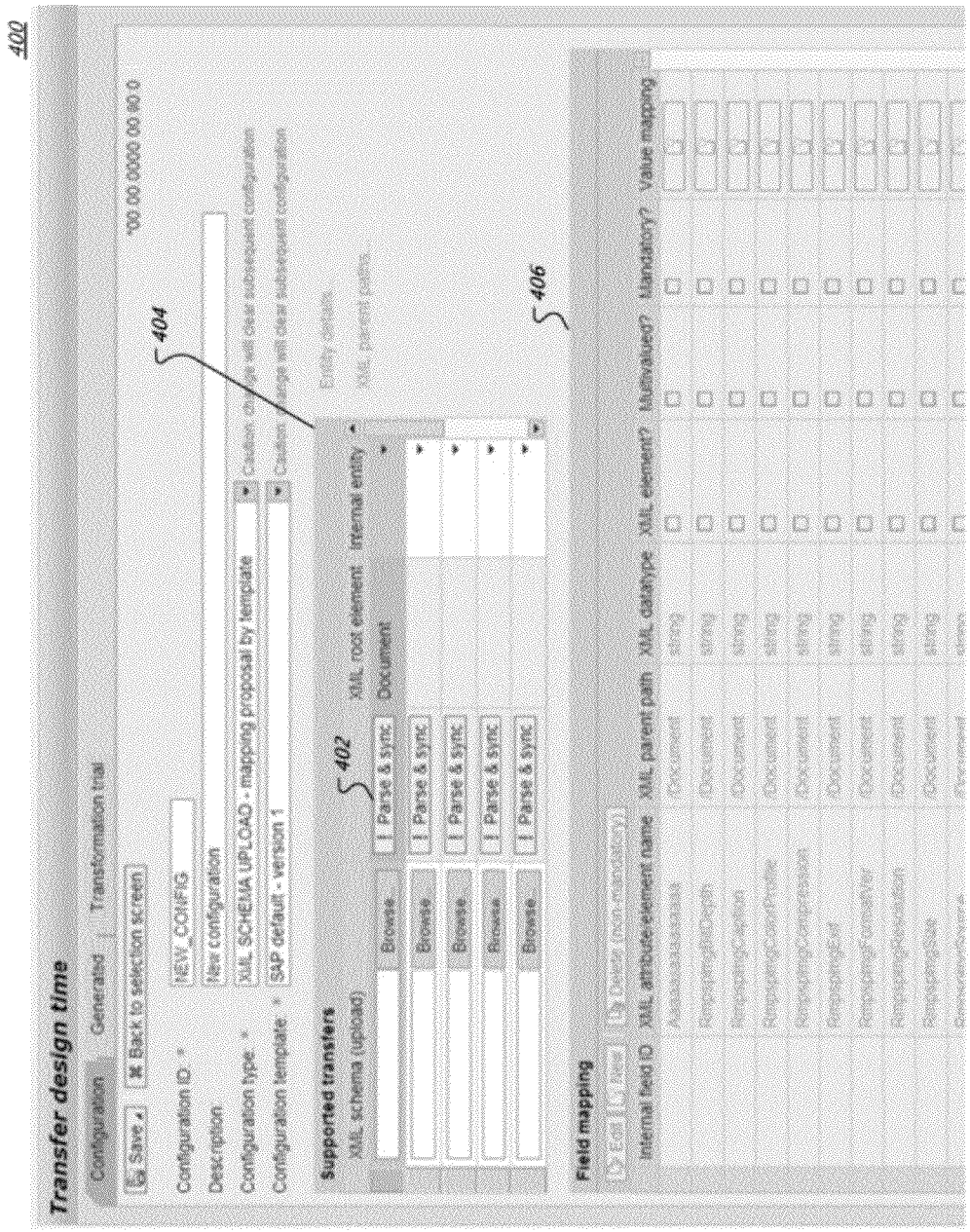
FIG. 4 shows a user interface for modifying mapping associations using an "XML Schema Upload" configuration type.

FIG. 4 shows a user interface 400 for modifying mapping associations using an "XML Schema Upload" configuration type. In this illustration, the user of the computing system has selected the "XML SCHEMA UPLOAD" option from the pull down menu 106 of FIG. 1. A user interface 400 similar to that shown in FIG. 4 was then displayed to the user, and the user selected the "Browse" interface element 402. In response, the computing system presented a pop up window for selecting a schema file. The user selected the schema file "DOCUMENT.XSD" from a displayed collection of schema files.

In response to user selection of the "DOCUMENT.XSD" file, the computing system parsed the content of the file and identified the XML attributes and elements in the schema definition. The computing system displayed the name of the root element of the XML file in the "Supported transfers" portion 404 of the user interface 400. Further, the computing system displayed the XML attributes and elements in the field mapping portion 406 of the user interface 400. In this example, the field mapping portion 406 is non-editable because the user has not yet specified an object type to which the XML schema (i.e., the XML document type) should be mapped.

Figure 5:
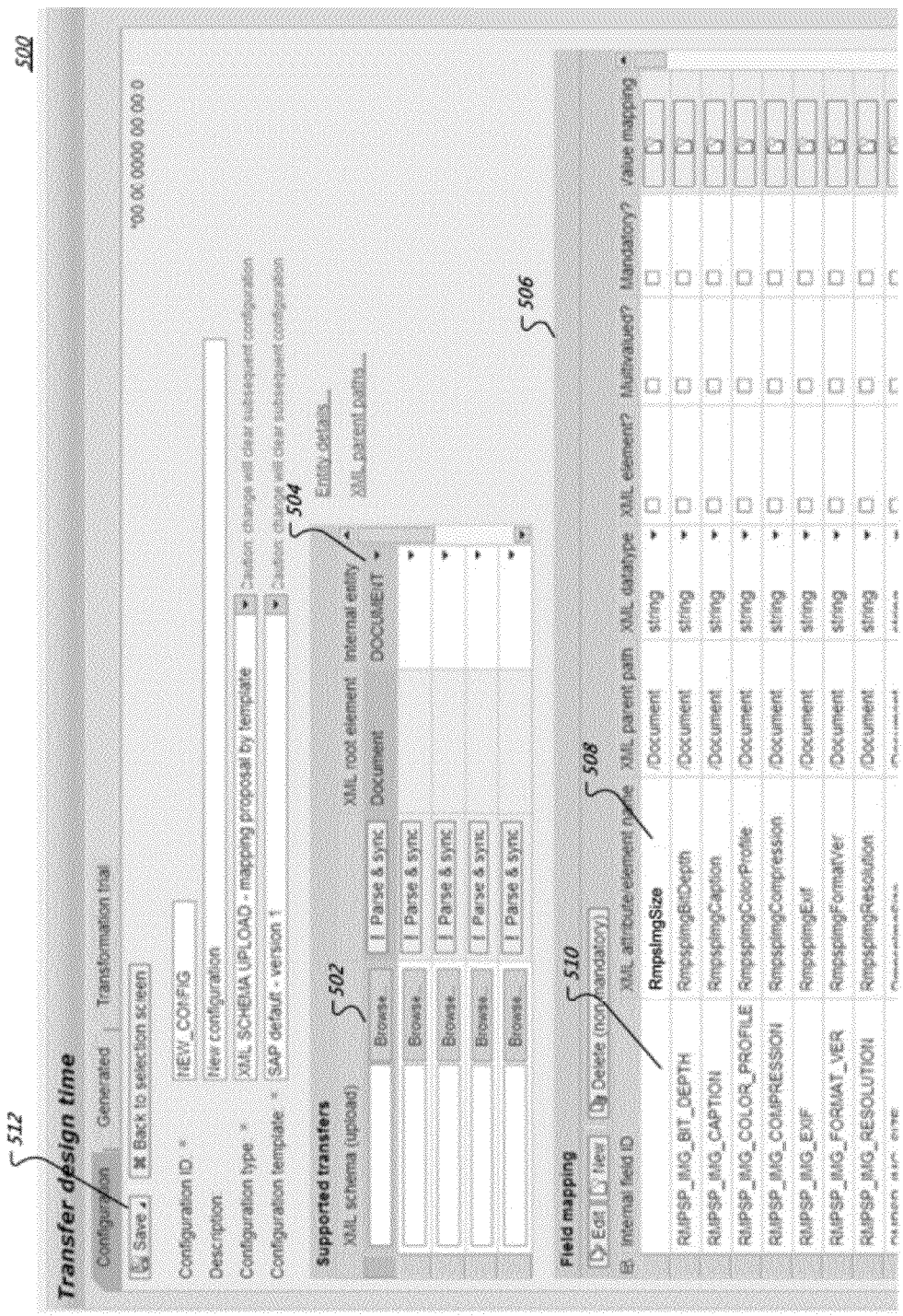
FIG. 5 shows a user interface for modifying mapping associations using an "XML Schema Upload" configuration type.

FIG. 5 shows a user interface 500 for modifying mapping associations using an "XML Schema Upload" configuration type. In this illustration, the user identified an object type that is named "DOCUMENT" by selecting the object type's name using the pull down menu 504. Thereafter, the user selected the interface element "! Parse & sync" 502 to cause the computer system to generate a proposed mapping of the "DOCUMENT" object type to the "Document" XML document type.

In response to user selection of the "! Parse & sync" user interface 500 element 502, the computer system parsed a schema for the user identified object type and compared the names of the object type's attributes to the names of the XML document type's attributes and elements (i.e., the attribute and element names from the "DOCUMENT.XSD" file). In those instances in which the computer system matches an object attribute name to an XML attribute or element name (e.g., because the names were the same or similar), the computer system displays the matching object attribute name in the same row as the corresponding XML attribute element name.

In this illustration, the computer system did not identify a match for the "RmpsImgSize" XML attribute or element name. As such, the graphical interface does not list an object attribute name in object attribute input field 510. The user may remedy the system's failure to identify a matching object attribute name by deleting the incomplete association or selecting an object attribute name with which to associate the XML attribute/element name.

The user may modify the mapping proposed by the computer system in a manner similar to that described with reference to FIG. 3. For example, the user may change the XML parent path, change the XML datatype, change whether an association identifies an XML element or an XML element, change whether an XML attribute or element is multivalued, change whether an association is mandatory, and add one or more value mappings. As described earlier, after the user has made his modifications to the proposed mapping, the user may save the data as a user-generated configuration by selecting the "Save" interface element 512.

Figure 6:
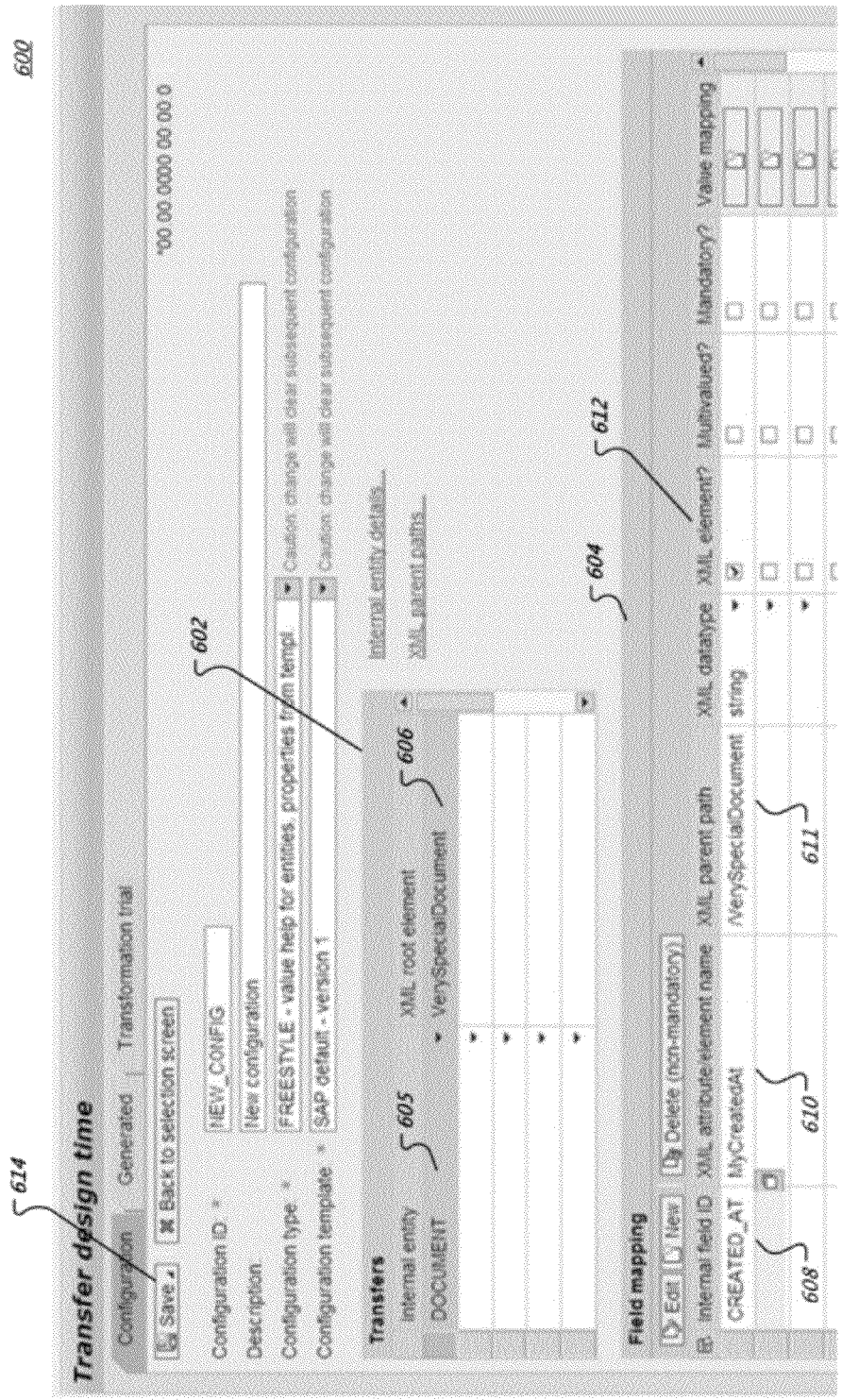
FIG. 6 shows a user interface for generating mapping associations using a "Freestyle" configuration type.

FIG. 6 shows a user interface 600 for generating mapping associations using a "Freestyle" configuration type. In this illustration, the user of the computing system has selected the "FREESTYLE" option from the pull down menu 106 of FIG. 1. In response, the computing system displays a user interface 600 for generating a mapping between one or more objects and one or more XML documents. In general, the user creates the mapping from scratch in this configuration type. For example, the computing system may display the user interface 600 to the user, without initially displaying any attributes or elements in the "Transfers" portion 602 of the user interface 600 and the "Field mapping" portion 604 of the user interface 600. The user may to specify such attributes or elements using the user interface 600.

In this illustration, the user has selected to map the internal object type "DOCUMENT" to XML documents of a type that includes the root element "VerySpecialDocument." In order to create this mapping, the user selects the internal object "DOCUMENT" from a set of internal objects that are displayed by the pull down menu 605. The user then specifies an XML root element for an associated XML document type by typing the text "VerySpecialDocument" into the XML root element text entry field 606.

After the user has selected the internal object type and the root element name, the user creates associations between attributes of the internal object type and attributes or elements of the XML document type. For example, the user clicks in the internal object attribute name field 608 and, in response, the computing system displays a set of internal object attributes for the "DOCUMENT" object type (e.g., the attributes listed in the "DOCUMENT" schema). The user selects the "CREATED_AT" attribute, and this attribute is shown in object attribute name field 608.

The user then specifies an associated XML element by typing the text "MyCreatedAt" into the XML attribute/element field 610. The user specifies characteristics of the association by selecting "string" as the datatype and selecting "XML element" using the checkbox 612. In some examples, the user interface 600 automatically displays the root element "VerySpecialDocument" as the XML parent path, although the user may edit the parent path by selecting the XML parent path input field 611 and typing a name of a different parent path. After the user completes the mapping (e.g., by generating multiple additional associations), the user may select the "Save" user interface element 614 to save the data as a user-generated configuration.

Regardless whether the user generates a configuration using the "TEMPLATE," "XML SCHEMA UPLOAD," or "FREESYTLE" configuration types, the user may generate a transformation template document and a XML schema document, for example, by selecting a "Generate Transformation Template" user interface element (not shown). The transformation template may be an XSLT file, or may be similar to an XSLT file, and can be used by a runtime program to transform data in an object into an XML file, and vice versa. The XML schema may represent the structure and content of XML files that are created from objects using the transformation template. The XML schema may also represent the structure and content of XML files that can be converted into internal objects using the transformation template.

Figure 7:
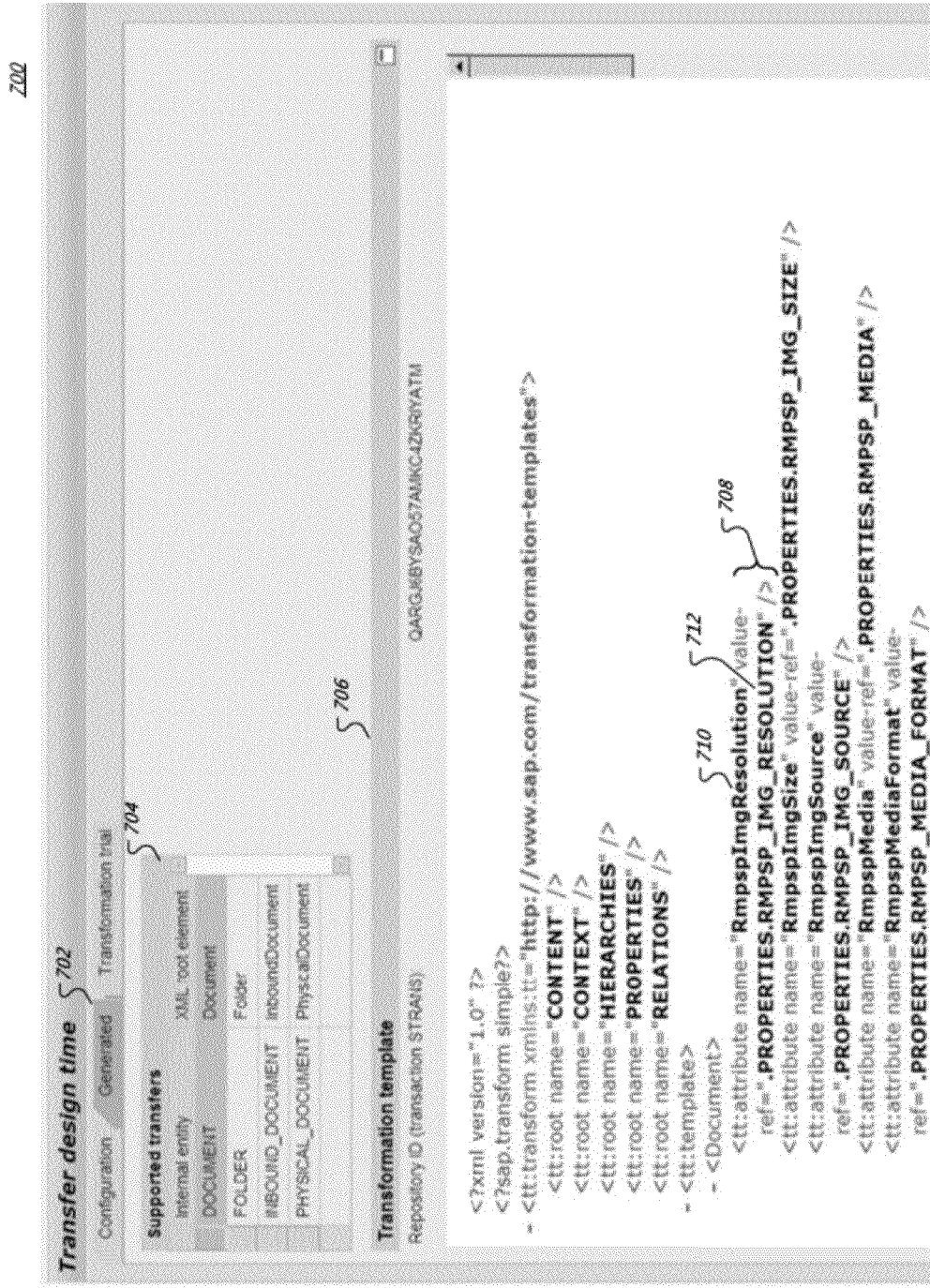
FIG. 7 shows a user interface that displays a transformation template.

FIG. 7 shows a user interface 700 that displays a transformation template. In this illustration, a user has provided user input that causes the computer system to generate the transformation template. In response to the user input, the user interface 700 shows a "Supported transfers" list 704 of the internal object types and their associated XML document types. The transformation template shown in the "Transformation template" portion 706 of the user interface 700 was generated for a presently selected row in the "Supported transfers" list 704. In this illustration, a transformation template representation of an association 708 shows an XML data attribute name 710 that is associated an internal object name 712.

Each of the rows in the "Supported transfers" list 704 may correspond to a different transformation template. As such, multiple XML documents for each of multiple XML document types may be generated if a transformation is executed. For example, multiple XML documents of the type "Document" may be generated from multiple corresponding objects of the type "DOCUMENT." Similarly, multiple XML documents of the type "Folder" may be generated from multiple corresponding objects of the type "FOLDER."

Figure 8:
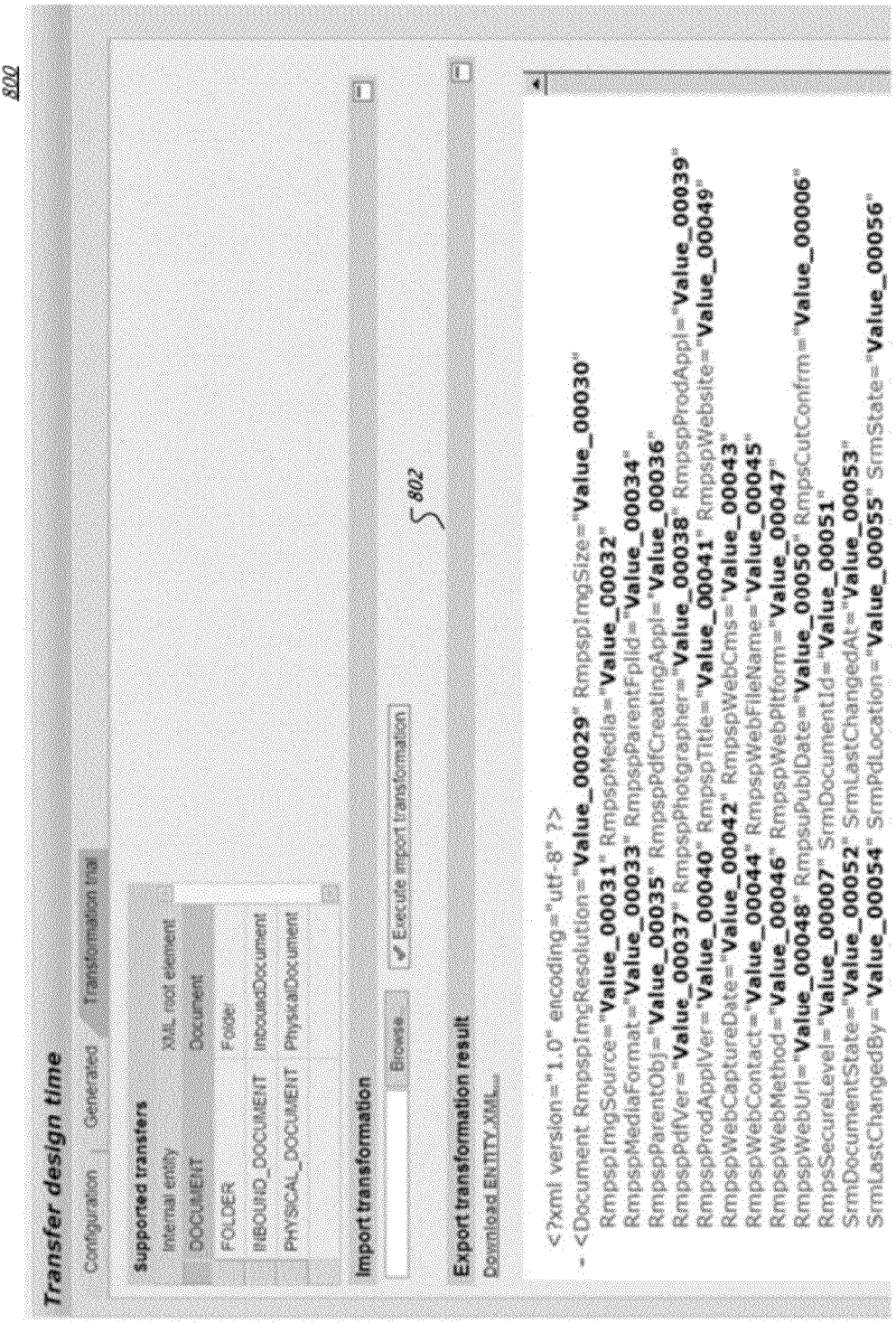
FIG. 8 shows a user interface that displays the results of a transformation trial.

FIG. 8 shows a user interface 800 that displays the results of a transformation trial. In this illustration, the computing system allows the user to perform a transformation trial with generated example data. In this illustration, an export transformation for the mapping "DOCUMENT" to "Document" was executed, and the resulting XML stream with a root tag of "Document" is displayed in the "Export transformation result" portion 802 of the user interface 800.

Figure 9:
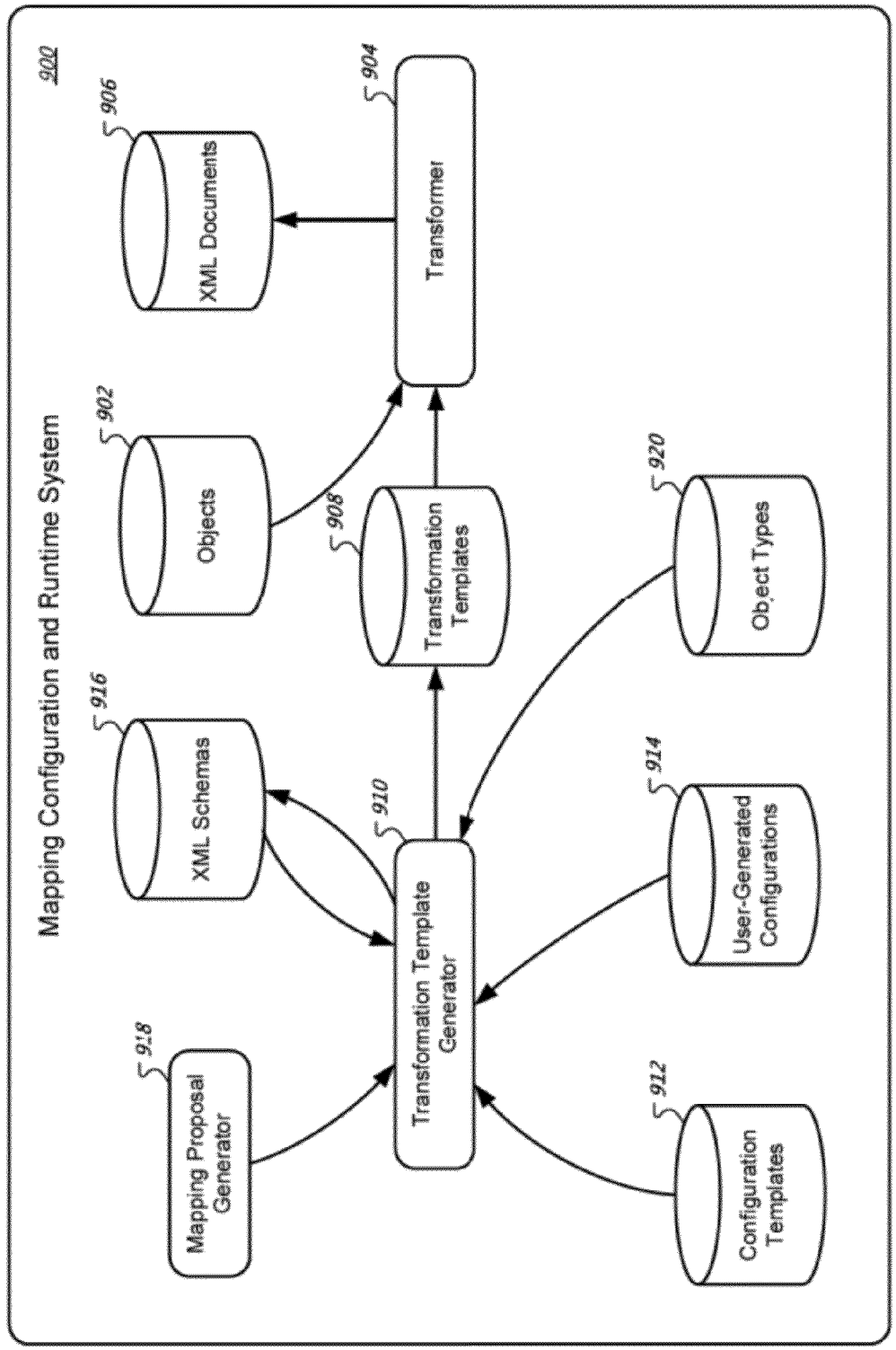
FIG. 9 shows a conceptual diagram of an example system for mapping data.

FIG. 9 shows a conceptual diagram of an example system for mapping data. In this illustration, the computer system includes a plurality of objects 902. Each object can be a data record that is an instantiation of an object schema with data values for the attributes referenced in the object schema. For example, the plurality of objects 902 can include multiple groups of different types of objects. As an illustration, the computer system may store six different "employment records" for six different individuals that are employed by a company, fifteen "product records" that include information about fifteen different products that are sold by the company, and several thousand "purchase order records" that represent the content of the company's customers' purchase order requests for the products.

The objects may be stored in an internal format that other computer systems are not configured to interpret. As such, a transformer 904 may transform these internal objects to XML documents 906 that can be interpreted by such other computer systems. The transformer 904 may use transformation templates 908 in order to convert the objects 902 to XML documents 906. For example, the transformer 904 may use a single transformation template 908 to convert the records of a specific object type to respective XML documents of a corresponding XML document type. Each object type may be associated with a different transformation template 908.

The transformation template generator 910 may provide a user interface 900 that allows a user to generate the transformation templates 908. In the "TEMPLATE" configuration type (see FIG. 1), the transformation template generator 910 enables a user to select one of multiple configuration templates 912. Each configuration template 912 may identify a suggested mapping of attributes of an object type to XML attributes or elements of a corresponding XML document type.

As described throughout this document, the user may change the associations of the suggested mapping to generate a modified mapping, and the computer system may store the modified mapping as a user-generated configuration 914. The transformation template generator 910 may generate a transformation template 908 from the user-generated configuration 914. The transformation template generator 910 may also generate an XML schema 916 that identifies the content and structure of the type of XML documents that are transformed using the generated transformation template 908.

In the "XML SCHEMA UPLOAD" configuration type (see FIG. 1), the transformation template generator 910 enables a user to upload an XML schema in order to generate a proposed mapping of an object type to an XML document type. In this configuration type, the user can select one of multiple XML schemas 916, and can select one of multiple object types 920. The mapping proposal generator 918 proposes mapping associations between the selected XML schema and the selected object type, for example, based on similarities between attribute names. The user can modify the proposed mapping, can save the modified mapping as a user-generated configuration 914, and can generate a transformation template 908 from the user-generated configuration 914.

In the "FREESTYLE" configuration type (see FIG. 1), the transformation template generator 910 enables a user to generate a mapping of an object type selected from a collection of object types 920 to an XML document type. The user may specify the characteristics of the XML document type by typing the names of the XML attributes or elements of the XML document type into fields of a user interface (see FIG. 6). The transformation template generator 910 may then generate an XML schema 916 and a transformation template 908.

Figure 10:
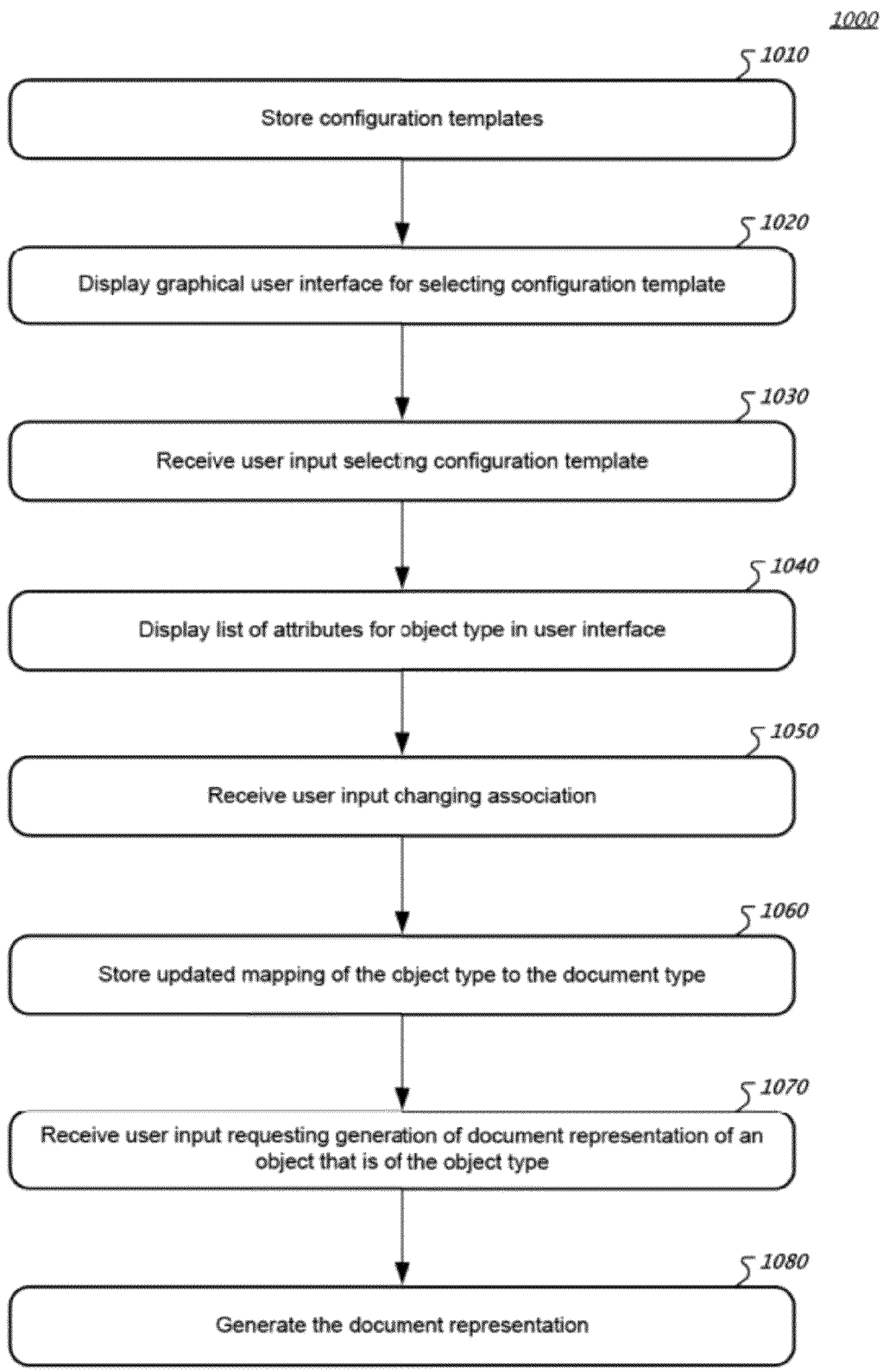
FIG. 10 is a flowchart of an example process for mapping an object type to an XML document type.

FIG. 10 is a flowchart of an example process 1000 for mapping an object type to an XML document type. The process 1000 may be performed by the system of FIG. 9, and may generate the user interfaces that are shown in FIGS. 1-8.

In box 1010, the computing system stores configuration templates. Each configuration template can identify an example mapping of an object type to an XML document type. For example, a first configuration template can identify an example mapping between a "person" object type and an "employee" XML document type.

In box 1020, the computing system displays a graphical user interface for selecting a configuration template. For example, the computing system may display the graphical user interface shown in FIG. 2.

In box 1030, the computing system receives user input selecting a configuration template. For example, a user of the computing system uses the computing system to select "SAP default—version 1" from the pull down menu 202.

In box 1040, the computing system displays a list of attributes for an object type in the user interface. For example, the computing system displays the object attributes that are shown under the "Internal Field ID" column 312 in FIG. 3.

In box 1050, the computing system receives user input changing an association. For example, a user of the computer system changes a name of the object attribute "BINARY_CONTENT," as shown in FIG. 3, to "TRINARY_CONTENT."

In box 1060, the computing system stores the updated mapping of the object type to the document type. For example, the computer system stores, as a user-generated configuration 914, a mapping that includes an association for the object attribute "TRINARY_CONTENT."

In box 1070, the computing system receives user input requesting generation of a document representation of an object that is of the object type. For example, the user may select a user interface element to generate an XML document 906 from an object 902.

In box 1080, the computing system generates the document representation. For example, the transformer 904 generates the XML document 906 from the object 902 using a mapping of a user-generated configuration 914 that is represented in a transformation template 908.

Figure 11:
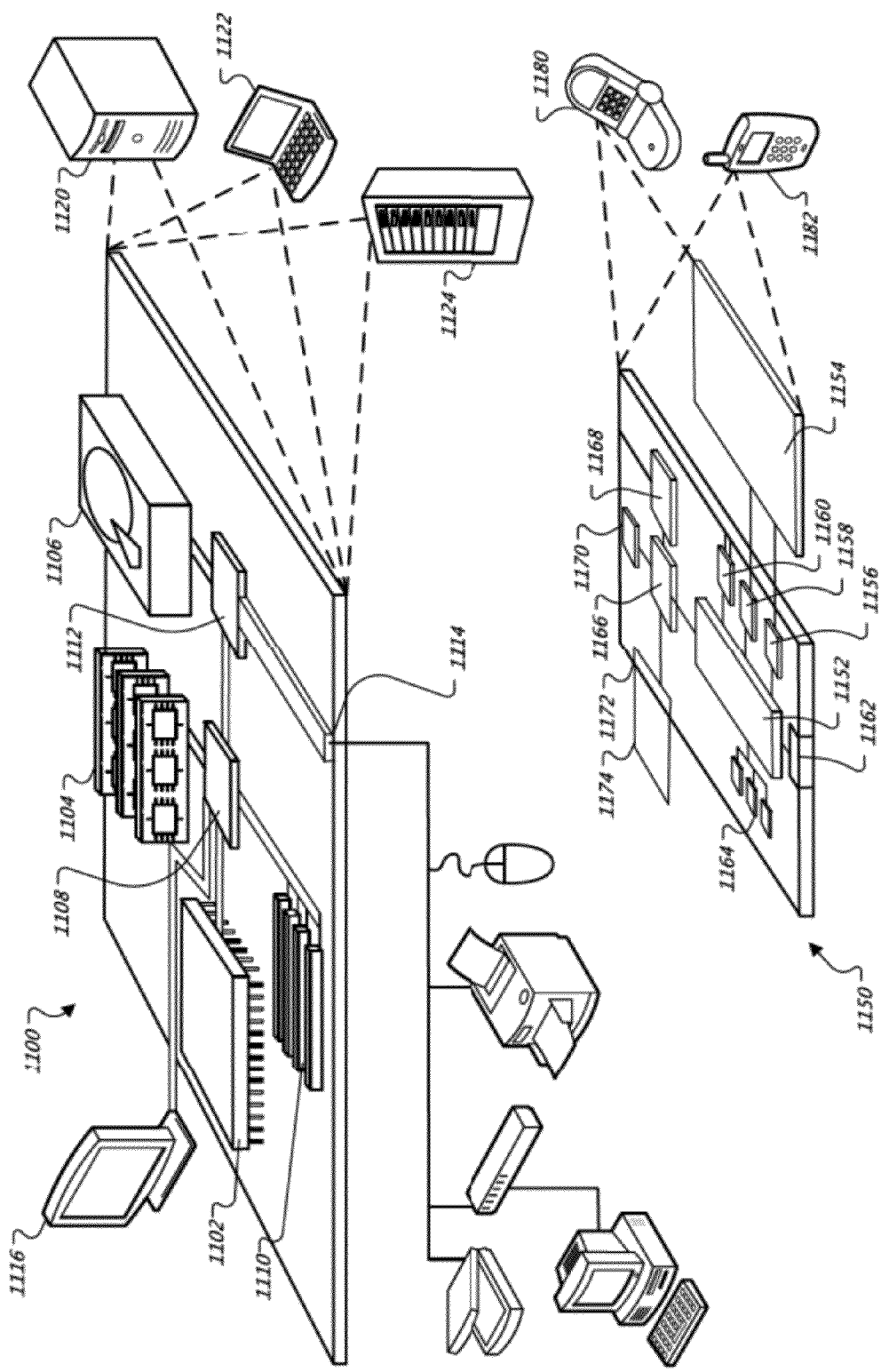
FIG. 11 is a block diagram of computing devices that may be used to implement the systems and methods described in this document, as either a client or as a server or plurality of servers.

FIG. 11 is a block diagram of computing devices 1100, 1150 that may be used to implement the systems and methods described in this document, as either a client or as a server or plurality of servers. Computing device 1100 is intended to represent various forms of digital computers, such as laptops, desktops, workstations, personal digital assistants, servers, blade servers, mainframes, and other appropriate computers. Computing device 1150 is intended to represent various forms of mobile devices, such as personal digital assistants, cellular telephones, smartphones, and other similar computing devices. The components shown here, their connections and relationships, and their functions, are meant to be exemplary only, and are not meant to limit implementations described and/or claimed in this document.

Computing device 1100 includes a processor 1102, memory 1104, a storage device 1106, a high-speed interface 1108 connecting to memory 1104 and high-speed expansion ports 1110, and a low speed interface 1112 connecting to low speed bus 1114 and storage device 1106. Each of the components 1102, 1104, 1106, 1108, 1110, and 1112, are interconnected using various busses, and may be mounted on a common motherboard or in other manners as appropriate. The processor 1102 can process instructions for execution within the computing device 1100, including instructions stored in the memory 1104 or on the storage device 1106 to display graphical information for a GUI on an external input/output device, such as display 1116 coupled to high speed interface 1108. In other implementations, multiple processors and/or multiple buses may be used, as appropriate, along with multiple memories and types of memory. Also, multiple computing devices 1100 may be connected, with each device providing portions of the necessary operations (e.g., as a server bank, a group of blade servers, or a multi-processor system).

The memory 1104 stores information within the computing device 1100. In one implementation, the memory 1104 is a volatile memory unit or units. In another implementation, the memory 1104 is a non-volatile memory unit or units. The memory 1104 may also be another form of computer-readable medium, such as a magnetic or optical disk.

The storage device 1106 is capable of providing mass storage for the computing device 1100. In one implementation, the storage device 1106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1104, the storage device 1106, or memory on processor 1102.

The high speed controller 1108 manages bandwidth-intensive operations for the computing device 1100, while the low speed controller 1112 manages lower bandwidth-intensive operations. Such allocation of functions is exemplary only. In one implementation, the high-speed controller 1108 is coupled to memory 1104, display 1116 (e.g., through a graphics processor or accelerator), and to high-speed expansion ports 1110, which may accept various expansion cards (not shown). In the implementation, low-speed controller 1112 is coupled to storage device 1106 and low-speed expansion port 1114. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1100 may be implemented in a number of different forms, as shown in the figure. For example, it may be implemented as a standard server 1120, or multiple times in a group of such servers. It may also be implemented as part of a rack server system 1124. In addition, it may be implemented in a personal computer such as a laptop computer 1122. Alternatively, components from computing device 1100 may be combined with other components in a mobile device (not shown), such as device 1150. Each of such devices may contain one or more of computing device 1100, 1150, and an entire system may be made up of multiple computing devices 1100, 1150 communicating with each other.

Computing device 1150 includes a processor 1152, memory 1164, an input/output device such as a display 1154, a communication interface 1166, and a transceiver 1168, among other components. The device 1150 may also be provided with a storage device, such as a microdrive or other device, to provide additional storage. Each of the components 1150, 1152, 1164, 1154, 1166, and 1168, are interconnected using various buses, and several of the components may be mounted on a common motherboard or in other manners as appropriate.

The processor 1152 can execute instructions within the computing device 1150, including instructions stored in the memory 1164. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 1150, such as control of user interfaces, applications run by device 1150, and wireless communication by device 1150.

Processor 1152 may communicate with a user through control interface 1158 and display interface 1156 coupled to a display 1154. The display 1154 may be, for example, a TFT (Thin-Film-Transistor Liquid Crystal Display) display or an OLED (Organic Light Emitting Diode) display, or other appropriate display technology. The display interface 1156 may comprise appropriate circuitry for driving the display 1154 to present graphical and other information to a user. The control interface 1158 may receive commands from a user and convert them for submission to the processor 1152. In addition, an external interface 1162 may be provide in communication with processor 1152, so as to enable near area communication of device 1150 with other devices. External interface 1162 may provide, for example, for wired communication in some implementations, or for wireless communication in other implementations, and multiple interfaces may also be used.

The memory 1164 stores information within the computing device 1150. The memory 1164 can be implemented as one or more of a computer-readable medium or media, a volatile memory unit or units, or a non-volatile memory unit or units. Expansion memory 1174 may also be provided and connected to device 1150 through expansion interface 1172, which may include, for example, a SIMM (Single In Line Memory Module) interface. Such expansion memory 1174 may provide extra storage space for device 1150, or may also store applications or other information for device 1150. Specifically, expansion memory 1174 may include instructions to carry out or supplement the processes described above, and may include secure information also. Thus, for example, expansion memory 1174 may be provide as a security module for device 1150, and may be programmed with instructions that permit secure use of device 1150. In addition, secure applications may be provided via the SIMM memory, along with additional information, such as placing identifying information on the SIMM memory in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1164, expansion memory 1174, or memory on processor 1152 that may be received, for example, over transceiver 1168 or external interface 1162.

Device 1150 may communicate wirelessly through communication interface 1166, which may include digital signal processing circuitry where necessary. Communication interface 1166 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1168. In addition, short-range communication may occur, such as using a Bluetooth, WiFi, or other such transceiver (not shown). In addition, GPS (Global Positioning System) receiver module 1170 may provide additional navigation- and location-related wireless data to device 1150, which may be used as appropriate by applications running on device 1150.

Device 1150 may also communicate audibly using audio codec 1160, which may receive spoken information from a user and convert it to usable digital information. Audio codec 1160 may likewise generate audible sound for a user, such as through a speaker, e.g., in a handset of device 1150. Such sound may include sound from voice telephone calls, may include recorded sound (e.g., voice messages, music files, etc.) and may also include sound generated by applications operating on device 1150.

The computing device 1150 may be implemented in a number of different forms, as shown in the figure. For example, it may be implemented as a cellular telephone 1180. It may also be implemented as part of a smartphone 1182, personal digital assistant, or other similar mobile device.

Additionally computing device 1100 or 1150 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs), USB flash drive) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method, comprising:
using, by a computing system, a particular object schema to generate multiple objects, wherein the particular object schema identifies constraints on a structure and content of the multiple objects, and wherein the multiple objects include a first object;
storing, by the computing system, multiple configuration templates that each identify a mapping of multiple attributes defined by a respective object schema to multiple attributes or elements defined by a respective markup language document schema;
displaying, by the computing system, a graphical user interface that permits a user of the computing system to select a first configuration template from a displayed set of the multiple configuration templates, wherein the first configuration template identifies a mapping of multiple attributes defined by the particular object schema to multiple attributes or elements defined by a particular markup language document schema;
receiving, by the computing system, first user input that selects the first configuration template;
displaying, by the computing system and concurrently in the graphical user interface:
 (i) a list of names of at least some attributes of the multiple attributes defined by the particular object schema, and
 (ii) for each of the at least some attributes, a name of the associated markup language attribute or element that is identified by the first configuration template, so as to visually indicate in the graphical user interface the mapping between each of the at least some attributes and its associated markup language attribute or element;
receiving, by the computing system, second user input that interacts with the displayed graphical user interface to change either:
 (i) a name for a particular one of the at least some attributes, or
 (ii) a name for a particular one of the associated markup language attributes or elements, so as to change a mapping that is identified by the first configuration template for the particular one of the at least some attributes or the particular one of the associated markup language attributes or elements;
generating, by the computing system and in response to receiving the second user input, an updated configuration template that identifies a mapping of the particular object schema to the particular markup language document schema, the updated configuration template including the changed mapping for the particular one of the at least some attributes or the particular one of the associated markup language attributes or elements, the updated configuration template configured to enable the computing system to export content associated with an object generated using the particular object schema to a document for which the particular markup language schema identifies constraints on structure and content;
receiving, by the computing system, third user input that requests generation of a first markup language document representation of the first object; and
generating, by the computing system and in response to receiving the third user input, the first markup language document using the updated configuration template.

2. The computer-implemented method of claim 1, further comprising:
receiving, by the computing system, fourth user input that requests creation of a second object that is of the particular object schema from a second markup language document that is of the markup language document schema; and generating, by the computing system and using the updated configuration template, the second object for storage by the computing system, the second object representing content of the markup language document.

3. The computer-implemented method of claim 1, wherein:
the updated configuration template includes a database table that identifies associations between attributes of the object type and markup language attributes or elements of the markup language document type; and
the updated configuration template does not include a markup language schema, a markup language document, or an XSLT document.

4. The computer-implemented method of claim 1, further comprising:
receiving, by the computing system, fourth user input that requests an addition of a new attribute to the list, the new attribute being an attribute of the particular object schema but not being one of the at least some attributes initially displayed in the list;
displaying, by the computing system, the new attribute in the list; and
receiving, by the computing system, fifth user input that specifies a name for a new markup language attribute or element that is to be associated with the new attribute;
wherein the updated configuration template includes an association between the new attribute and the new markup language attribute or element.

5. The computer-implemented method of claim 1, wherein the graphical user interface permits the user to specify, for an association between a particular attribute of the particular object schema and an associated particular markup language attribute or element, a value mapping of a first data value for the particular attribute to a second data value for the particular markup language attribute or element, the first data value and the second value being different, the particular attribute specifying semantics of the first value and the particular markup language attribute or element specifying semantics of the second data value.

6. The computer-implemented method of claim 1, wherein the graphical user interface permits the user to change, for an association between a particular attribute of the particular object schema and an associated particular markup language attribute or element, a value of a "MaxOccurs" property of the particular markup language attribute or element from "0" to "*", without the user providing user input that specifies "*".

7. The computer-implemented method of claim 1, wherein the graphical user interface further permits the user to alternatively generate a mapping between the particular object schema and a second type of markup language document by:
the computing system receiving fourth user input that selects a markup language schema that identifies a structure and content of the second type of markup language document from a list of multiple markup language schemas for identifying structure and content of multiple respective types of markup language documents;
the computing system comparing names of attributes of the particular object schema to names of markup language attributes and elements of the markup language schema in order for the computing system to propose a mapping of the attributes of the particular object schema to the markup language attributes and elements of the markup language schema; and
the computing system displaying the proposed mapping to the user to enable the user to modify the proposed mapping.

8. A computer-readable storage device storing instructions that, when executed by one or more processing devices, perform operations comprising:
using, by a computing system, a particular object schema to generate multiple objects, wherein the particular object schema identifies constraints on a structure and content of the multiple objects, and wherein the multiple objects include a first object;
storing, by the computing system, multiple configuration templates that each identify a mapping of multiple attributes defined by a respective object schema to multiple attributes or elements defined by a respective markup language document schema;
displaying, by the computing system, a graphical user interface that permits a user of the computing system to select a first configuration template from a displayed set of the multiple configuration templates, wherein the first configuration template identifies a mapping of multiple attributes defined by the particular object schema to multiple attributes or elements defined by a particular markup language document schema;
receiving, by the computing system, first user input that selects the first configuration template;
displaying, by the computing system and concurrently in the graphical user interface:
(i) a list of names of at least some attributes of the multiple attributes defined by the particular object schema, and
(ii) for each of the at least some attributes, a name of the associated markup language attribute or element that is identified by the first configuration template, so as to visually indicate in the graphical user interface the mapping between each of the at least some attributes and its associated markup language attribute or element;
receiving, by the computing system, second user input that interacts with the displayed graphical user interface to change either:
(i) a name for a particular one of the at least some attributes, or
(ii) a name for a particular one of the associated markup language attributes or elements, so as to change a mapping that is identified by the first configuration template for the particular one of the at least some attributes or the particular one of the associated markup language attributes or elements;
generating, by the computing system and in response to receiving the second user input, an updated configuration template that identifies a mapping of the particular object schema to the particular markup language document schema, the updated configuration template including the changed mapping for the particular one of the at least some attributes or the particular one of the associated markup language attributes or elements, the updated configuration template configured to enable the computing system to export content associated with an object generated using the particular object schema to a document for which the particular markup language schema identifies constraints on structure and content;
receiving, by the computing system, third user input that requests generation of a first markup language document representation of the first object; and
generating, by the computing system and in response to receiving the third user input, the first markup language document using the updated configuration template.

9. The computer-readable storage device of claim 8, wherein the operations further comprise:
   receiving, by the computing system, fourth user input that requests creation of a second object that is of the particular object schema from a second markup language document that is of the markup language document schema; and
   generating, by the computing system and using the updated configuration template, the second object for storage by the computing system, the second object representing content of the markup language document.

10. The computer-readable storage device of claim 8, wherein:
   the updated configuration template includes a database table that identifies associations between attributes of the object type and markup language attributes or elements of the markup language document type; and
   the updated configuration template does not include a markup language schema, a markup language document, or an XSLT document.

11. The computer-readable storage device of claim 8, wherein the operations further comprise:
   receiving, by the computing system, fourth user input that requests an addition of a new attribute to the list, the new attribute being an attribute of the particular object schema but not being one of the at least some attributes initially displayed in the list;
   displaying, by the computing system, the new attribute in the list; and
   receiving, by the computing system, fifth user input that specifies a name for a new markup language attribute or element that is to be associated with the new attribute;
   wherein the updated configuration template includes an association between the new attribute and the new markup language attribute or element.

12. The computer-readable storage device of claim 8, wherein the graphical user interface permits the user to specify, for an association between a particular attribute of the particular object schema and an associated particular markup language attribute or element, a value mapping of a first data value for the particular attribute to a second data value for the particular markup language attribute or element, the first data value and the second value being different, the particular attribute specifying semantics of the first value and the particular markup language attribute or element specifying semantics of the second data value.

13. The computer-readable storage device of claim 8, wherein the graphical user interface permits the user to change, for an association between a particular attribute of the particular object schema and an associated particular markup language attribute or element, a value of a "MaxOccurs" property of the particular markup language attribute or element from "0" to "*", without the user providing user input that specifies "*".

14. The computer-readable storage device of claim 8, wherein the graphical user interface further permits the user to alternatively generate a mapping between the particular object schema and a second type of markup language document by:
   the computing system receiving fourth user input that selects a markup language schema that identifies a structure and content of the second type of markup language document from a list of multiple markup language schemas for identifying structure and content of multiple respective types of markup language documents;
   the computing system comparing names of attributes of the particular object schema to names of markup language attributes and elements of the markup language schema in order for the computing system to propose a mapping of the attributes of the particular object schema to the markup language attributes and elements of the markup language schema; and
   the computing system displaying the proposed mapping to the user to enable the user to modify the proposed mapping.

15. A system comprising:
one or more programmable processors; and
a computer-readable storage device storing instructions that, when executed by the one or more programmable processors, perform operations comprising:
   using, by a computing system, a particular object schema to generate multiple objects, wherein the particular object schema identifies constraints on a structure and content of the multiple objects, and wherein the multiple objects include a first object;
   storing, by the computing system, multiple configuration templates that each identify a mapping of multiple attributes defined by a respective object schema to multiple attributes or elements defined by a respective markup language document schema;
   displaying, by the computing system, a graphical user interface that permits a user of the computing system to select a first configuration template from a displayed set of the multiple configuration templates, wherein the first configuration template identifies a mapping of multiple attributes defined by the particular object schema to multiple attributes or elements defined by a particular markup language document schema;
   receiving, by the computing system, first user input that selects the first configuration template;
   displaying, by the computing system and concurrently in the graphical user interface:
      (i) a list of names of at least some attributes of the multiple attributes defined by the particular object schema, and
      (ii) for each of the at least some attributes, a name of the associated markup language attribute or element that is identified by the first configuration template, so as to visually indicate in the graphical user interface the mapping between each of the at least some attributes and its associated markup language attribute or element;
   receiving, by the computing system, second user input that interacts with the displayed graphical user interface to change either:
      (i) a name for a particular one of the at least some attributes, or
      (ii) a name for a particular one of the associated markup language attributes or elements, so as to change a mapping that is identified by the first configuration template for the particular one of the at least some attributes or the particular one of the associated markup language attributes or elements;
   generating, by the computing system and in response to receiving the second user input, an updated configuration template that identifies a mapping of the particular object schema to the particular markup language document schema, the updated configuration template including the changed mapping for the particular one of the at least some attributes or the particular one of the associated markup language attributes or elements, the updated configuration template configured to enable the computing system to export content associated with an object generated using the particular object schema to a document for which the particular markup language schema identifies constraints on structure and content;

receiving, by the computing system, third user input that requests generation of a first markup language document representation of the first object; and generating, by the computing system and in response to receiving the third user input, the first markup language document using the updated configuration template.

16. The system of claim 15, wherein the operations further comprise:

receiving, by the computing system, fourth user input that requests creation of a second object that is of the particular object schema from a second markup language document that is of the markup language document schema; and generating, by the computing system and using the updated configuration template, the second object for storage by the computing system, the second object representing content of the markup language document.

17. The system of claim 15, wherein:

the updated configuration template includes a database table that identifies associations between attributes of the object type and markup language attributes or elements of the markup language document type; and the updated configuration template does not include a markup language schema, a markup language document, or an XSLT document.

18. The system of claim 15, wherein the operations further comprise:

receiving, by the computing system, fourth user input that requests an addition of a new attribute to the list, the new attribute being an attribute of the particular object schema but not being one of the at least some attributes initially displayed in the list;

displaying, by the computing system, the new attribute in the list; and receiving, by the computing system, fifth user input that specifies a name for a new markup language attribute or element that is to be associated with the new attribute;

wherein the updated configuration template includes an association between the new attribute and the new markup language attribute or element.

19. The system of claim 15, wherein the graphical user interface permits the user to specify, for an association between a particular attribute of the particular object schema and an associated particular markup language attribute or element, a value mapping of a first data value for the particular attribute to a second data value for the particular markup language attribute or element, the first data value and the second value being different, the particular attribute specifying semantics of the first value and the particular markup language attribute or element specifying semantics of the second data value.

20. The system of claim 15, wherein the graphical user interface further permits the user to alternatively generate a mapping between the particular object schema and a second type of markup language document by:

the computing system receiving fourth user input that selects a markup language schema that identifies a structure and content of the second type of markup language document from a list of multiple markup language schemas for identifying structure and content of multiple respective types of markup language documents;

the computing system comparing names of attributes of the particular object schema to names of markup language attributes and elements of the markup language schema in order for the computing system to propose a mapping of the attributes of the particular object schema to the markup language attributes and elements of the markup language schema; and the computing system displaying the proposed mapping to the user to enable the user to modify the proposed mapping.

* * * * *